March 29, 1927.

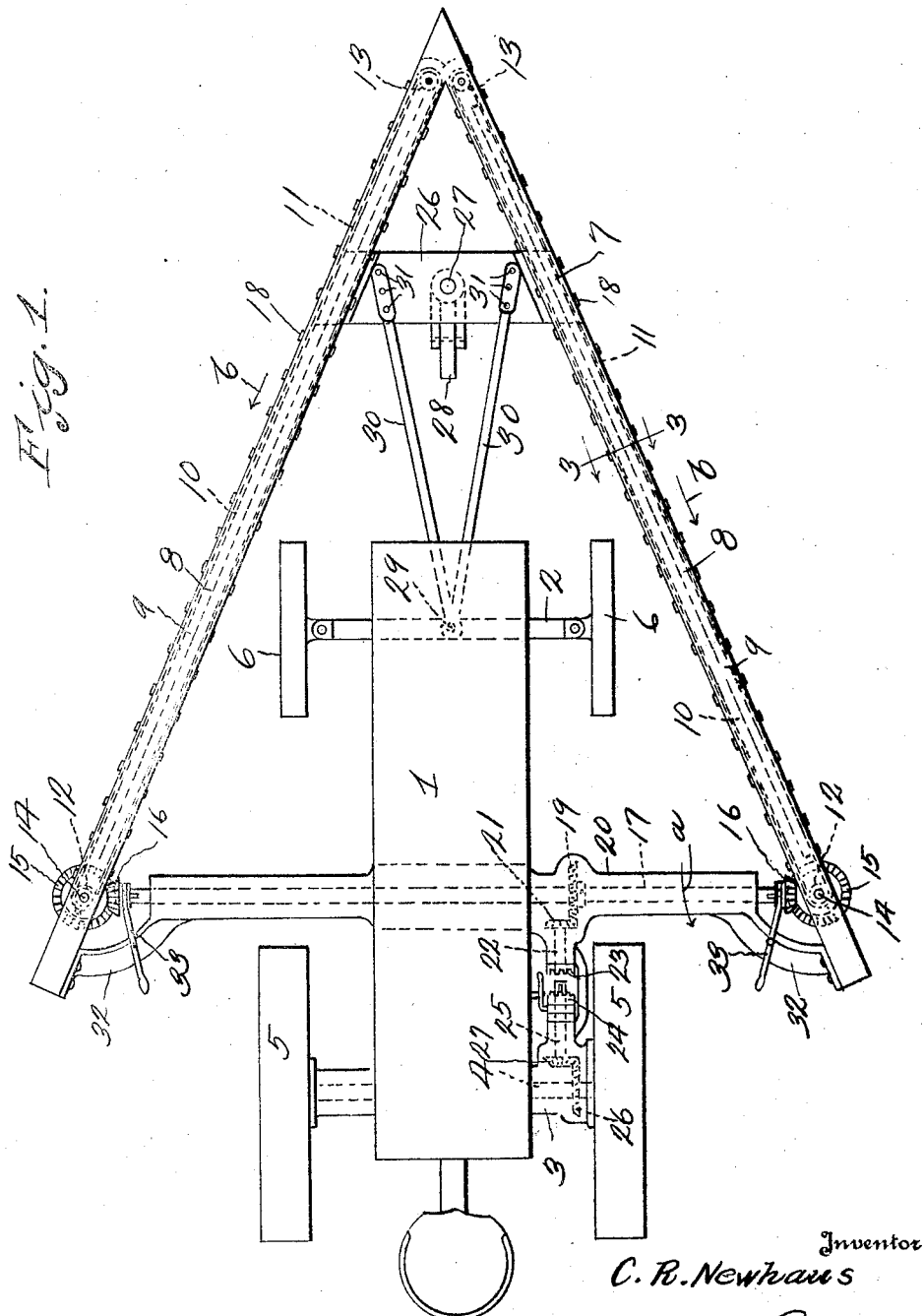

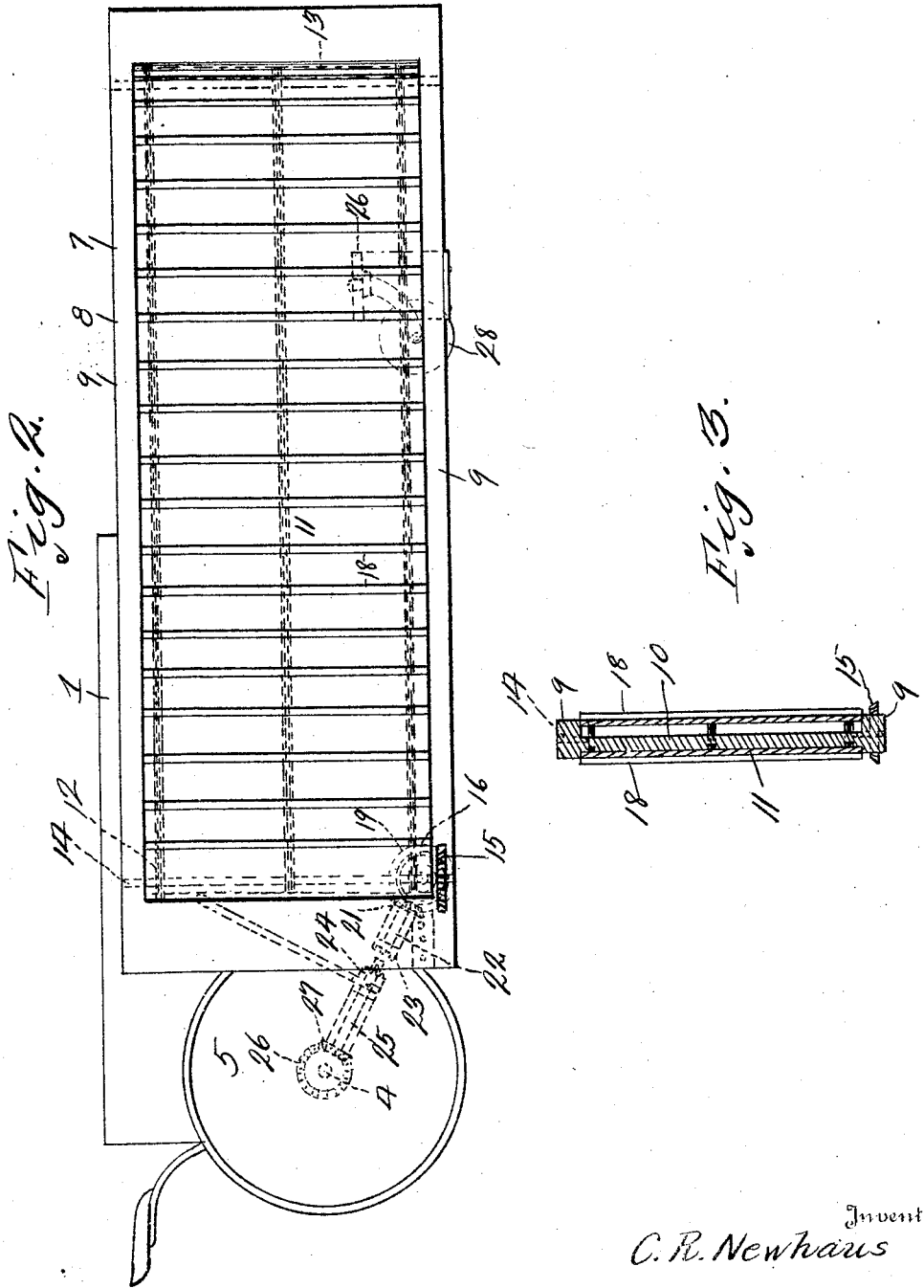

C. R. NEWHAUS 1,622,338

SNOW PLOW

Filed March 8, 1926

Inventor
C. R. Newhaus
By Philip A. H. Sewell
Attorney

Patented Mar. 29, 1927.

1,622,338

UNITED STATES PATENT OFFICE.

CLAUS R. NEWHAUS, OF BENSON, NEBRASKA.

SNOWPLOW.

Application filed March 8, 1926. Serial No. 93,166.

The invention relates to snow plows, and has for its object to provide a device of this character comprising a V-shaped frame connected to a tractor and housing the front end of the tractor, and which frame has its converging sides provided with endless belts for substantially their full height and driving connections between the tractor drive mechanism and the belts whereby they will be simultaneously rotated in the same direction.

A further object is to provide the plow adjacent its forward end and forwardly of the tractor with a castor wheel which will easily rotate, support the forward end of the V-shaped frame and at the same time allow the tractor to be steered to the right or left.

A further object is to provide the frame with bases on which the outer sides of the endless belts slide thereby forming a firm background for the endless conveyors as the plow is forced through the snow. Also to provide the belts with vertically disposed bars which will have a gripping action on the snow and as the conveyor belts operate in a direction towards the rear of the tractor said bars will assist in the forward movement of the tractor by gripping the snow as the snow is forced apart.

A further object is to provide a transversely disposed shaft carried by the tractor which shaft has bevelled gear connections with vertically disposed shafts of the belts, driving connections between said shaft and the axle of the tractor and clutch means whereby said transversely disposed shaft may be rotated as desired.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a top plan view of the snow plow and tractor.

Figure 2 is a side elevation of the plow and tractor.

Figure 3 is a vertical transverse sectional view taken on line 3—3 of Figure 1.

Figure 4:
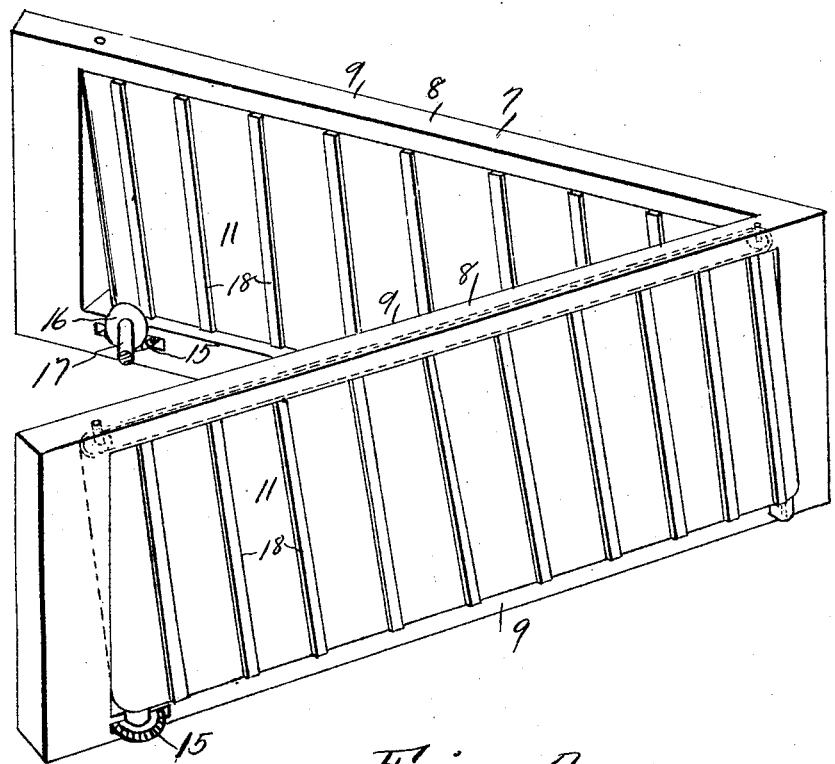
Figure 4 is a perspective view of a modified form of plow.

Referring to the drawing, the numeral 1 designates a conventional form of tractor, 2 the front axle thereof and 3 the rear axle casing in which is rotatably mounted the rear axle 4. The rear axle 4 is driven in the usual manner and drives the ground engaging wheels 5 for advancing the tractor. The forward axle 2 is provided with wheels 6 of the stub axle type which are used for steering wheels in the usual manner. Disposed forwardly of the tractor 1 is a V-shaped frame 7, the sides 8 of which diverge rearwardly to opposite sides of the tractor and substantially house the forward end of the tractor. The sides 8 of the frame are rectangularly shaped and comprise upper and lower bars 9 and between said bars are backing boards 10 against which the outer portion of the endless belt conveyors 11 slidably engage. The backing boards 10 form a rigid backing for the belt conveyors 11 and prevent bulging inwardly thereof when the plow is forced forwardly through the snow by the tractor 1. Belt conveyors extend over vertically disposed rollers 12 at the rear ends of the frames and over rollers 13 at the forward ends of the frames, therefore it will be seen that the belt conveyors are positively guided by the rollers. The rear rollers 12 are provided with shafts 14 to the lower ends of which are connected bevelled gears 15, with which bevelled gears 16, carried by the ends of the transversely disposed shaft 17 mesh, therefore it will be seen that when the transversely disposed shaft 17 is rotated in the direction of the arrow a, the outer sides of the endless belt conveyors 11 will move in the direction of the arrows b, and the vertically disposed slats 18 carried by the conveyor belts will grip the snow as the plow is forced through the same, and will not only insure the proper spreading of the snow and prevent packing thereof but will also assist the forward movement of the tractor and plow as a whole.

The transversely disposed shaft 17 is provided with a bevelled gear 19, within the casing 20, and which bevelled gear meshes with a bevelled gear 21 carried by an upwardly and rearwardly extending shaft 22. The shaft 22 terminates in a clutch member 23 adjacent a slidable clutch member 24 on a shaft 25. The shaft 25 is driven during the operation of the tractor through the medium of the bevelled gear 26 carried by the shaft 4 and the bevelled gear 27 carried by the shaft 25, therefore it will be seen that during the forward movement of the tractor, at which time the shaft 4 rotates, and when the slidable clutch member 24 is in engagement with the member 23, the endless belt conveyors 11 will continuously operate for gripping, spreading and parting the snow.

Extending transversely between the frames 8 adjacent their forward ends is a plate 26, to which is pivotally connected at 27 a conventional form of castor wheel 28, and which castor wheel allows lateral movement of the forward end of the plow during a steering operation of the tractor, and it also supports the forward end of the plow. Connected at 29 to the axle 2 are forwardly diverging brace bars 30, which are connected at 31 to to the plate 26, therefore it will be seen that the forward end of the plow is thoroughly braced. The rear ends of the frames 8 are supported by the bracket arms 32 carried by the outer ends of the shaft casing 20, therefore the rear end of the plow is supported and braced.

From the above it will be seen that a snow plow is provided which is supported and operated by a conventional form of tractor, is positive in its operation and is provided with driven endless conveyor belts having slats, which conveyor belts are in converging relation and substantially house the forward end of the tractor. It will also be seen that the driving power for the belts is obtained from the tractor driving mechanism.

Gears 16 are controlled by levers 33 and are slidably keyed on the shaft 17, therefore it will be seen that either conveyor 11 may be operated as desired. The lower sides of the conveyors 11 may be outwardly disposed in relation to their upper sides if so desired as shown in Figure 4.

The invention having been set forth what is claimed as new and useful is:—

1. The combination with a tractor, a V-shaped snow plow disposed forwardly of said tractor, the sides of said V-shaped snow plow diverging to opposite sides of the tractor, endless belt conveyors carried by the sides of said plow, a transversely disposed shaft carried by the tractor, gear drive connections between the transversely disposed shaft and the endless belt conveyors, a driving connection between the transversely disposed shaft and one of the axles of the tractor and clutch means for controlling the operation of the transversely disposed shaft.

2. The combination with a tractor, a V-shaped snow plow disposed forwardly of the tractor, endless belt conveyors carried by said plow at opposite sides of the tractor, vertically disposed slats carried by said conveyors, of driving means for said belt conveyors, said driving means comprising a transversely disposed shaft carried by the tractor, gear connections between the shaft and the endless belt conveyors, a rear axle carried by the tractor and controllable driving connections between the rear axle of the tractor and the transversely disposed shaft.

3. A snow plow comprising a tractor, a V-shaped snow plow forwardly of the tractor and having its side diverging to opposite sides of the tractor, endless belt conveyors carried by the sides of the snow plow, driving connections between the endless belt conveyors and the tractor, a transversely disposed plate carried by the plow forwardly of the tractor, a castor wheel carried by said plate, rearwardly converging brace bars carried by said plate, said brace bars being anchored to the tractor.

In testimony whereof I hereunto affix my signature.

CLAUS R. NEWHAUS.